(12) United States Patent
Matsuoka (10) Patent No.: US 8,363,118 B2
(45) Date of Patent: Jan. 29, 2013

(54) IMAGE PROCESSING DEVICE AND METHOD FOR CONTROLLING THE SAME

(75) Inventor: Masaaki Matsuoka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 50 days.

(21) Appl. No.: 13/169,752

(22) Filed: Jun. 27, 2011

(65) Prior Publication Data

US 2012/0013752 A1 Jan. 19, 2012

(30) Foreign Application Priority Data

Jul. 14, 2010 (JP) ................................ 2010-160097
Jun. 7, 2011 (JP) ................................ 2011-127658

(51) Int. Cl.
*H04N 5/228* (2006.01)
*G06K 9/40* (2006.01)

(52) U.S. Cl. .................... 348/208.99; 382/274

(58) Field of Classification Search ............ 348/208.99, 348/744–745; 382/274–275

See application file for complete search history.

(56) References Cited

U.S. PATENT DOCUMENTS

| | | | | |
|---|---|---|---|---|
| 6,108,440 A | * | 8/2000 | Baba et al. | ............... 382/154 |
| 2007/0097328 A1 | * | 5/2007 | Li et al. | ............... 353/70 |
| 2007/0248260 A1 | * | 10/2007 | Pockett | ............... 382/154 |
| 2011/0034176 A1 | * | 2/2011 | Lord et al. | ............... 455/450 |

FOREIGN PATENT DOCUMENTS

| | | |
|---|---|---|
| JP | 4178481 | 11/2008 |
| JP | 2009-058868 | 11/2009 |

* cited by examiner

*Primary Examiner* — Aung S Moe
*Assistant Examiner* — Mekonnen Dagnew
(74) *Attorney, Agent, or Firm* — Cowan, Liebowitz & Latman, P.C.

(57) ABSTRACT

An image processing device calculates a coordinate transformation coefficient for each of a plurality of regions, and, for at least one point of interest in a local region, calculates a correction amount that is used when blur in a target image is corrected using a coordinate transformation coefficient for the local region and a correction amount that is used when the blur in the target image is corrected using a coordinate transformation coefficient for a region neighboring the local region. In this case, if the correction amount difference does not fall within a predetermined limit value, a coordinate transformation coefficient is newly obtained for each of the plurality of regions including the local region so that the correction amount difference falls within the predetermined limit value, and the target image is corrected for each region using the newly obtained coordinate transformation coefficient.

8 Claims, 10 Drawing Sheets

| | | | | | |
|---|---|---|---|---|---|
| | 1 | 1 | 1 | 1 | 1 |
| | 28 | 29 | 30 | 31 | |
| | 1 | 1 | 0.75 / 38_0 | 0.75 / 38_1 | 0.75 / 39_0 | 0.75 / 39_1 |
| | | | 0.75 / 38_2 | 0.5 / 38_3 | 0.5 / 39_2 | 0.5 / 39_3 |
| | 36 | 37 | | | | |
| | 1 | 1 | 0.75 / 46_0 | 0.5 / 46_1 | 0.25 / 47_0 | 0.25 / 47_1 |
| | | | 0.75 / 46_2 | 0.5 / 46_3 | 0.25 / 47_2 | 0 / 47_3 |
| | 44 | 45 | | | | |

IMAGE PROCESSING DEVICE AND METHOD FOR CONTROLLING THE SAME

BACKGROUND OF THE INVENTION

1. Field of the Invention

The present invention relates to techniques for correcting blur in the image of an object that is caused by the motion of an imaging device.

2. Description of the Related Art

At present, imaging devices, such as digital cameras and the like, are often equipped with various functions for compensating for camera shake (i.e., image stabilization functions) in order to prevent the image of an object from being blurred by the motion of the image device due to, for example, camera shake caused by the user during shooting. There are basically two techniques of image stabilization, optical image stabilization and electrical image stabilization. In electrical image stabilization, a plurality of images captured are used to correct blur in the object image by image processing. Japanese Patent No. 4178481 discloses a technique of correcting blur in the object image by calculating a motion vector by feature pattern matching between two captured images, and rotating and translating one of the images based on the direction and amount of the motion vector.

When the imaging device is tilted downward relative to the optical axis, that is, in the pitch direction, portions having higher image height of the object image may be distorted into a trapezoidal shape; that is, the so-called "keystone effect" may occur. When the "keystone effect" occurs, a plurality of motion vectors having different components are detected in the image because the amount of blur in the image varies depending on the position in the image. Also, when the imaging device is moved, the amount of blur in the object image may vary depending on the position in the image because of the difference in distance between the imaging device and the object. Japanese Patent Laid-Open No. 2009-258868 discloses a technique of correcting blur in the object image by dividing a captured image into a plurality of regions, detecting a motion vector for each region, and correcting the image by applying different correction amounts based on the motion vectors to the different regions.

However, when an image is corrected by applying different correction amounts to different regions as in Japanese Patent Laid-Open No. 2009-258868, the following problem may arise. If the number of regions into which the image is divided is small, there may be variations in the detected motion vector. Specifically, when the image is corrected on a region-by-region basis, a discontinuation (positional offset) may occur in the object image between some adjacent regions, and the user may recognize such a positional offset as an image degradation. If the number of regions into which the image is divided is increased (the size of each region is decreased), the variations in the detected motion vector can be reduced, but the amount of computation increases that is required to calculate affine coefficients for the regions that are used to obtain correction amounts for the regions. In other words, particularly when image stabilization is applied to moving images, the increase in the amount of computation may lead to a reduction in the frame rate at which the moving images are processed.

SUMMARY OF THE INVENTION

The present invention has been made in view of the aforementioned problems with the conventional art. The present invention provides a technique of efficiently correcting blur in an object image caused by the motion of an imaging device.

According to one aspect of the present invention, there is provided an image processing device including a correction unit configured to compare a reference image with a target image, and correct an offset of the target image from the reference image that is caused by motion of an imaging device capturing the target image, for each region of the target image, the device comprising: a division unit configured to divide the target image into a plurality of the regions; a setting unit configured to set at least one of the plurality of regions as a local region; a coordinate transformation coefficient calculation unit configured to calculate a coordinate transformation coefficient for each of the plurality of regions; a correction amount calculation unit configured to, for at least one point of interest in the local region set by the setting unit, calculate a correction amount that is used when the offset of the target image is corrected using the coordinate transformation coefficient for the local region calculated by the coordinate transformation coefficient calculation unit, and a correction amount that is used when the offset of the target image is corrected using the coordinate transformation coefficient for one of the plurality of regions neighboring the local region; and a determination unit configured to determine whether or not a difference between the correction amount obtained from the coordinate transformation coefficient for the local region calculated by the correction amount calculation unit, and the correction amount obtained from the coordinate transformation coefficient for the neighboring region calculated by the correction amount calculation unit, falls within a predetermined limit value, wherein the coordinate transformation coefficient calculation unit, when the determination unit determines that the correction amount difference does not fall within the predetermined limit value, newly calculates a coordinate transformation coefficient for each of the plurality of regions so that the correction amount difference falls within the predetermined limit value, and the correction unit corrects the offset of the target image for each of the plurality of regions using the correction amount obtained for the each of the plurality of regions using the newly calculated coordinate transformation coefficient.

According to another aspect of the present invention, there is provided a method for controlling an image processing device including a correction unit configured to compare a reference image with a target image, and correct an offset of the target image from the reference image that is caused by motion of an imaging device capturing the target image, for each region of the target image, the method comprising the steps of: dividing the target image into a plurality of the regions; setting at least one of the plurality of regions as a local region; calculating a coordinate transformation coefficient for each of the plurality of regions; calculating, for at least one point of interest in the local region set in the setting step, a correction amount that is used when the offset of the target image is corrected using the coordinate transformation coefficient for the local region calculated in the coordinate transformation coefficient calculating step, and a correction amount that is used when the offset of the target image is corrected using the coordinate transformation coefficient for one of the plurality of regions neighboring the local region; and determining whether or not a difference between the correction amount obtained from the coordinate transformation coefficient for the local region calculated in the correction amount calculating step, and the correction amount obtained from the coordinate transformation coefficient for the neighboring region calculated in the correction amount calculating step, falls within a predetermined limit value, wherein, in the coordinate transformation coefficient calculating step, when it is determined in the determining step that the correction amount difference does not fall within the predetermined limit value, a coordinate transformation coefficient for each of the plurality of regions is newly calculated so that the correction amount difference falls within the predetermined limit value, and in the correcting step, the offset of the target image is corrected for each of the plurality of regions using the correction amount obtained for the each of the plurality of regions using the newly calculated coordinate transformation coefficient.

Further features of the present invention will become apparent from the following description of exemplary embodiments (with reference to the attached drawings).

DESCRIPTION OF THE EMBODIMENTS (First Embodiment)

A preferred embodiment of the present invention will be described in detail hereinafter with reference to the accompanying drawings. Note that, in the embodiment described below, an example will be described in which the present invention is applied to a digital camera as an example image processing device that can correct blur in the captured image of an object that is caused by the motion of the imaging device on a region-by-region basis, where the image is divided into a plurality of regions. However, the present invention is applicable to any devices in which, when there are an input reference image and a input target image to be corrected, an offset (blur) of the target image from the reference image that is caused by the motion of an imaging device that captures the images is corrected on a region-by-region basis, where the target image is divided into a plurality of regions. As used herein, the term "local region" in the target image refers to one of the regions into which the target image is divided and that is located at one of the four corners of the target image. In such a region, a significant offset (blur) may occur in the object image if the so-called "keystone effect" occurs during shooting. One or more local regions are previously determined. However, in the present invention, the local region is not limited to those located at the four corners of the target image, but may be set to be any region.

Note that the term "blur in an object image" or "offset of an object image" as used herein refers to an offset between a target image to be corrected and a reference image in terms of position or rotation of the object image. The term "positional offset of an object image between regions" when a target image to be corrected is divided into a plurality of regions and a position or a rotation is corrected for each region, refers to a discontinuation in the object image between adjacent regions in the corrected image.

Figure 1:
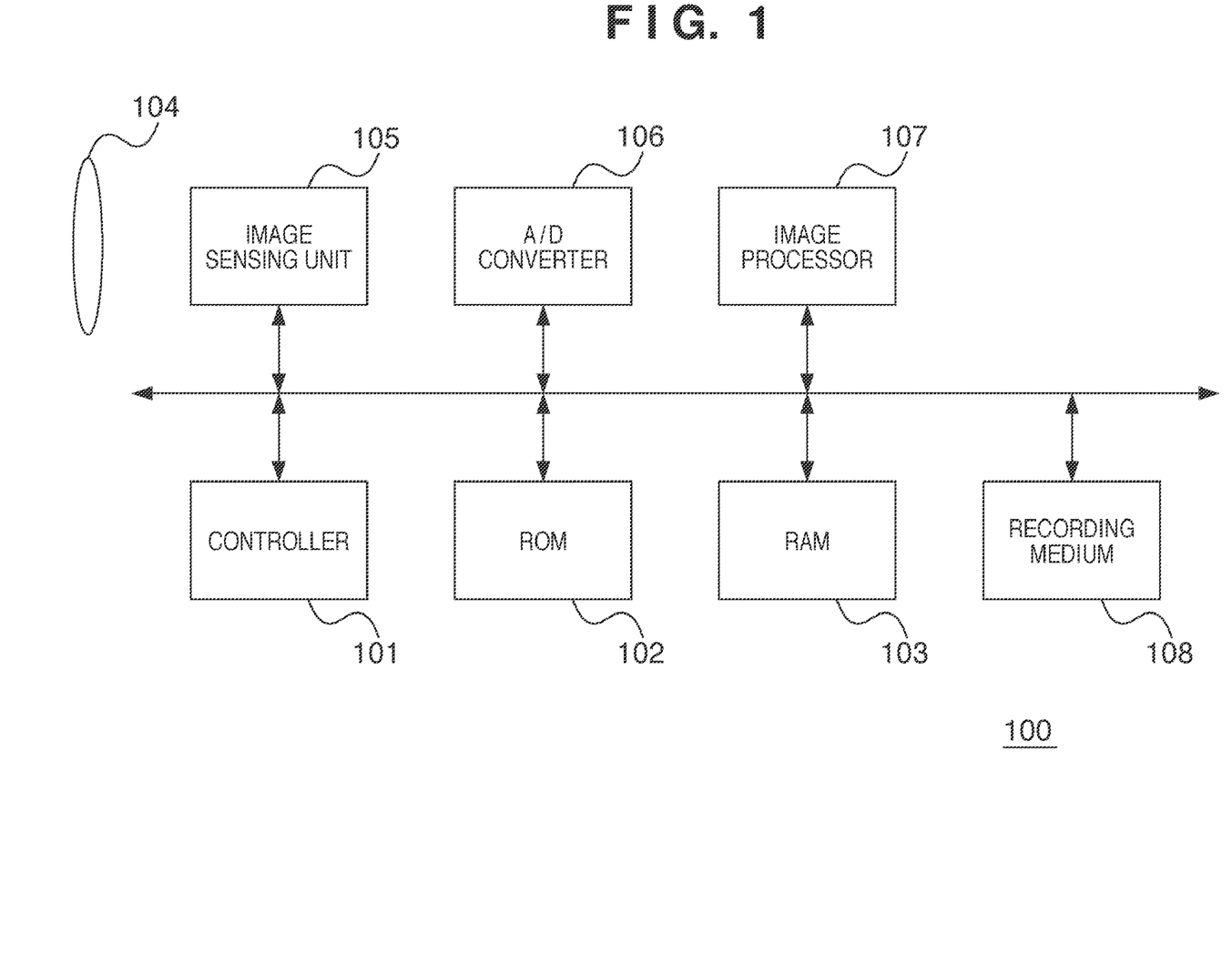
FIG. 1 is a block diagram showing a functional configuration of a digital camera according to an embodiment of the present invention.

FIG. 1 is a block diagram showing a functional configuration of a digital camera according to an embodiment of the present invention.

A controller 101 that is, for example, a CPU reads an operating program for each block included in the digital camera 100 from a ROM 102, loads the operation program into a RAM 103, and executes the operating program to control the operation of each block of the digital camera 100. The ROM 102 is a rewritable non-volatile memory and stores not only the operating program for each block included in the digital camera 100, but also, for example, parameters required to operate each block, such as the number of regions into which an image is divided, etc. The RAM 103 is a rewritable volatile memory and is used as a memory area for temporarily storing data output during the operation of each block included in the digital camera 100. In this embodiment, the RAM 103 temporarily stores a reference image that is required to detect blur in an object image in a target image that is caused by the motion of the imaging device, a target image before correction, etc.

An image sensing unit 105 that is, for example, an image capture device, such as a CCD, a CMOS sensor, etc., photoelectrically converts an optical image formed on the image capture device by an optical system 104, and outputs a resulting analog image signal to an A/D converter 106. The A/D converter 106 performs an A/D conversion process on the input analog image signal, and outputs resulting digital image data (image data) to the RAM 103, which stores the digital image data.

Figure 2:
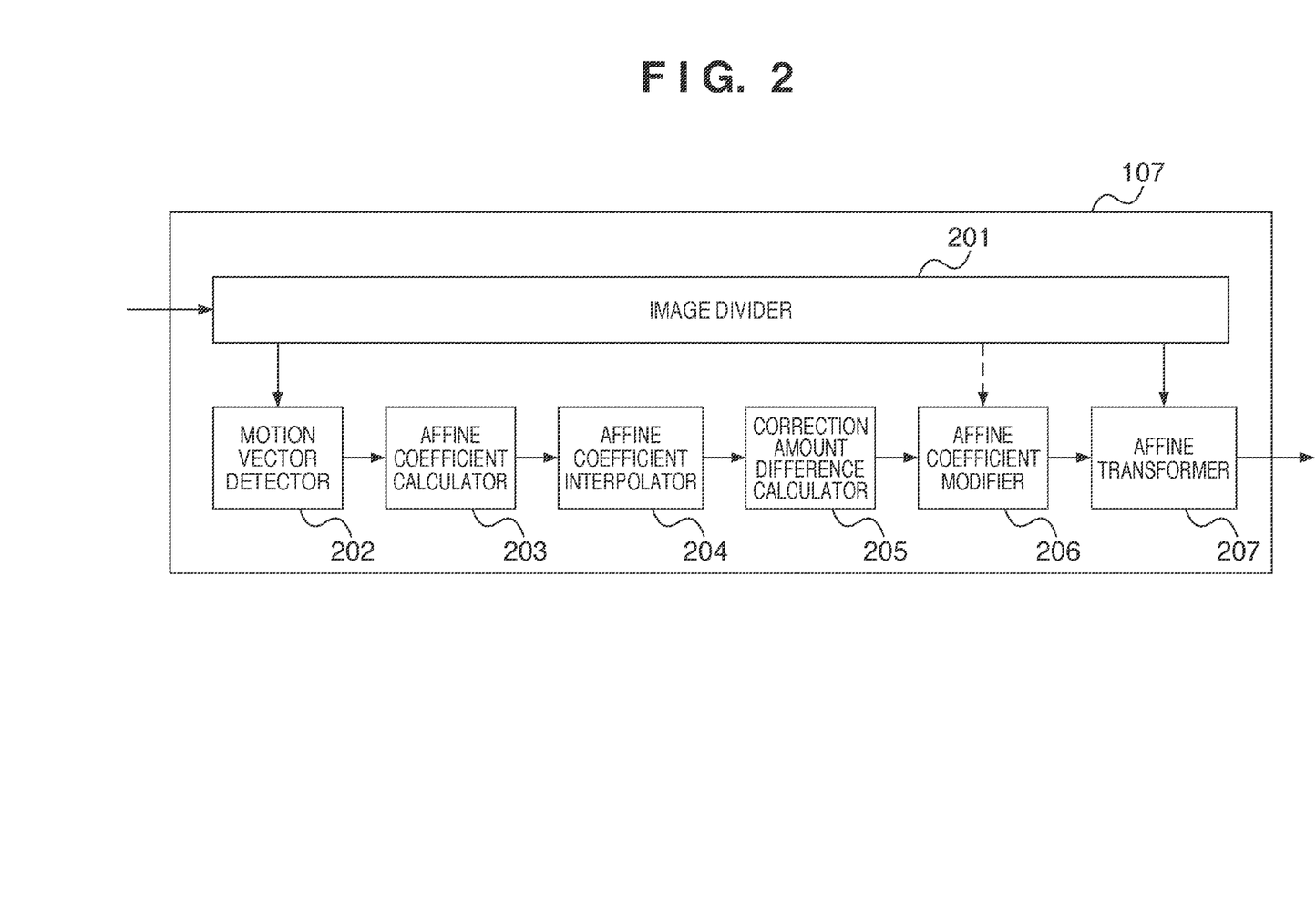
FIG. 2 is a block diagram showing a functional configuration of an image processor according to the embodiment of the present invention.

In the digital camera of this embodiment, an image processor 107 performs a process of correcting blur in an object image that is caused by the motion of the digital camera 100 during shooting, in captured image data. FIG. 2 is a block diagram showing an internal configuration of the image processor 107. In order to detect blur in an object image that is caused by the motion of the digital camera 100 during shooting, the image processor 107 receives a target image to be corrected in which the blur is detected, and a reference image that is used as a reference for correction. Note that it is assumed that the controller 101 reads the reference image and the target image from the RAM 103 into the image processor 107.

Figure 3:
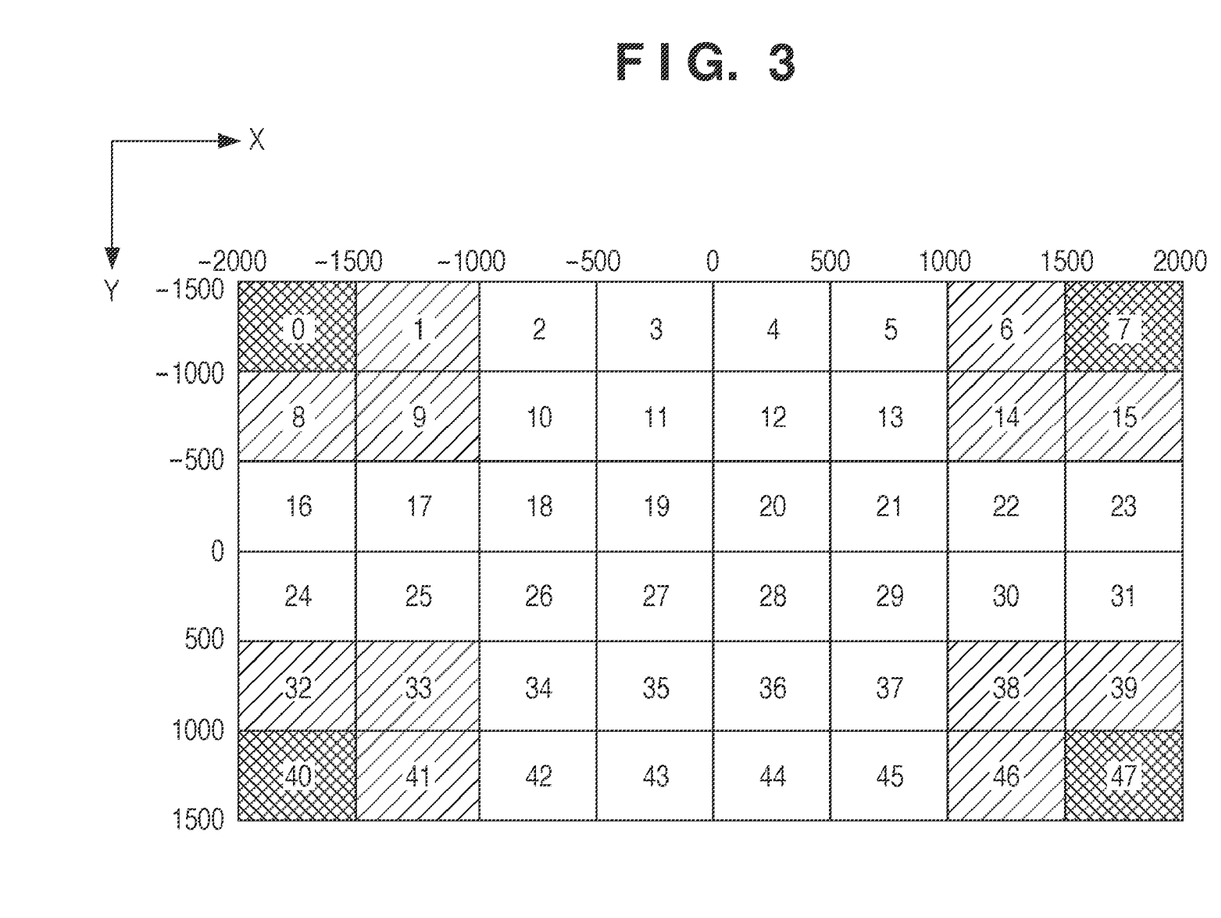
FIG. 3 is a diagram for describing a technique of dividing an image in the embodiment of the present invention.

An image divider 201 divides an input image into regions having a predetermined size. In this embodiment, for example, when the input image has 4000×3000 pixels, the input image is divided into rectangular regions having 500×

500 pixels as shown in FIG. 3. Note that, in this embodiment, it is assumed that the amount of correction of the input image to the image divider 201 is calculated using a coordinate system whose origin corresponds to the center of the image. In the coordinate system, the downward direction of the image is the positive direction of the y axis and the rightward direction of the image is the positive direction of the x axis. The coordinate system is divided into four sectors called quadrants, which are numbered from 1st to 4th clockwise around the center of the image, starting from the lower right quadrant.

A motion vector detector 202 detects a motion vector of the object image in the target image for each of the regions obtained by the image divider 201. Specifically, the motion vector detector 202 detects a motion vector based on the movement of an image having the same pattern between the reference image and the target image, using, for example, a block matching technique similar to that described in Japanese Patent Laid-Open No. 2009-258868 in which the object image in neighboring regions in the target image is compared with the reference image.

Figure 10A:
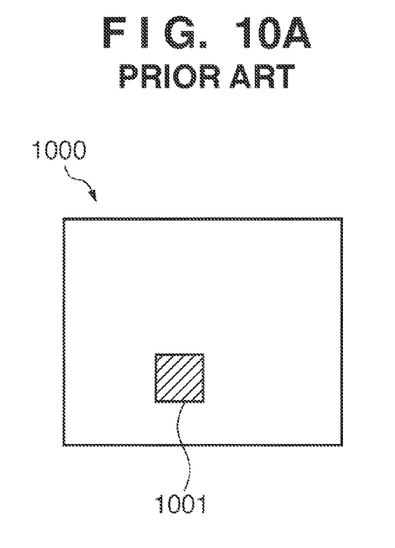
FIGS. 10A and 10B are first diagrams for describing a block matching technique.

FIGS. 10A, 10B, 11, 12, 13, 14, and 15 are diagrams for describing an overview of the block matching technique disclosed in Japanese Patent Laid-Open No. 2009-258868. In this block matching technique, for example, as shown in FIG. 10A, it is assumed that, in a target frame 1000 as a reference image, there is a block (target block) 1001 having a rectangular region having a predetermined size and including a plurality of pixels in the horizontal direction and a plurality of lines in the vertical direction.

Figure 10B:
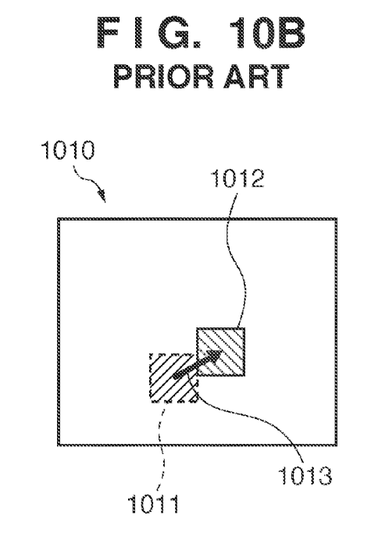

In block matching, a block having a high correlation with the target block 1001 is searched for in a reference frame 1010 as a target image shown in FIG. 10B. As a result of the search, a reference block 1012 having a highest correlation is detected and obtained in the reference frame 1010, and this block is referred to as a motion compensation block. Note that a positional offset between the target block 1001 and the motion compensation block 1012 (reference block having a highest correlation) is a motion vector detected by the motion vector detector 202.

A motion vector 1013 corresponding to the positional offset (including the amount and direction of the positional offset) between the target block 1001 and the motion compensation block 1012 is calculated as follows. The target block 1001 of the target frame 1000 is assumed to be projected onto the reference frame 1010 at the same position as that of the target block 1001 of the target frame 1000. The resulting target block 1001 in the reference frame 1010 is referred to as a projected image block 1011. The motion vector 1013 corresponds to a positional offset between a position (e.g., a center position) of the projected image block 1011 of the target block and a position (e.g., a center position) of the motion compensation block 1012. The motion vector 1013 includes the amount and direction of the positional offset as its components.

Figure 11:
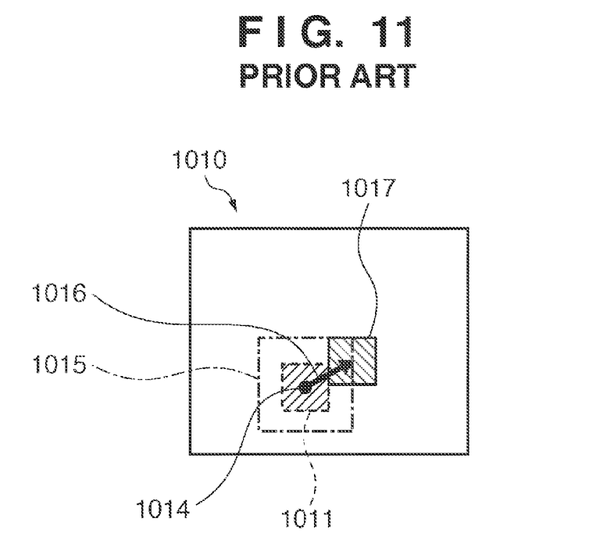
FIG. 11 is a second diagram for describing the block matching technique.

An overview of the block matching process will be described. In FIG. 11, in the reference frame 1010, the projected image block 1011 of the target block 1001 is shown by a dashed line at the same position as that of the target block 1001 of the target frame 1000. The coordinate point of a center of the projected image block 1011 is defined as an origin 1014 for motion detection. It is assumed that the motion vector 1013 exists within a predetermined range from the motion detection origin 1014. The predetermined range whose center is the motion detection origin 1014 is set as a search range 1015 indicated by a dot-dash line in FIG. 11.

Next, a block (referred to as a reference block) 1017 having the same size as that of the target block 1001 is set in the reference frame 1010. The position of the reference block 1017 is moved on a pixel-by-pixel basis or on a group of pixels basis in the horizontal and vertical directions within the search range 1015, for example. Therefore, there are a plurality of the reference blocks 1017 set within the search range 1015.

Here, the movement of the reference block 1017 within the search range 1015 means in this example that, because the motion detection origin 1014 is the center position of the target block, the center position of the reference block 1017 is moved within the search range 1015. Note that some of the pixels included in the reference block 1017 may lie outside the search range 1015.

For each reference block 1017 set within the search range 1015, a vector (referred to as a reference vector) 1016 (see FIG. 11) is set that indicates the amount and direction of a positional offset between the reference block 1017 and the target block 1001. A correlativity between the image content of the reference block 1017 located at a position indicated by the reference vector 1016 and the image content of the target block 1001 is evaluated.

Figure 12:
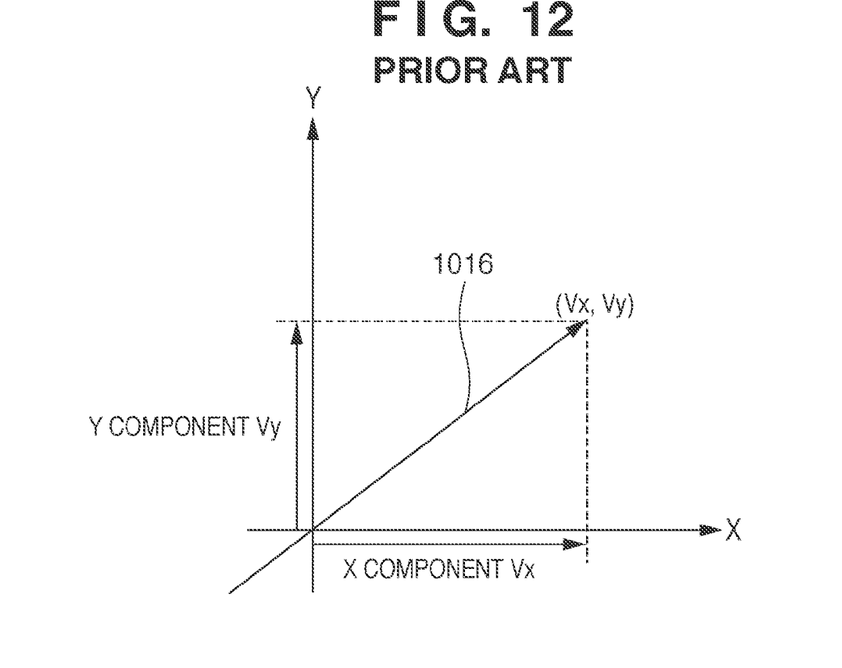
FIG. 12 is a third diagram for describing the block matching technique.

As shown in FIG. 12, the reference vector 1016 is represented by a vector (Vx, Vy) where Vx is the amount of the positional offset of the reference block 1017 in the horizontal direction (X direction), and Vy is the amount of the positional offset of the reference block 1017 in the vertical direction (Y direction). If the coordinates of a position (e.g., a center) of the reference block 1017 are the same as the coordinates of a position (e.g., a center) of the target block 1001, the reference vector 1016 is represented by a vector (0, 0).

Figure 13:
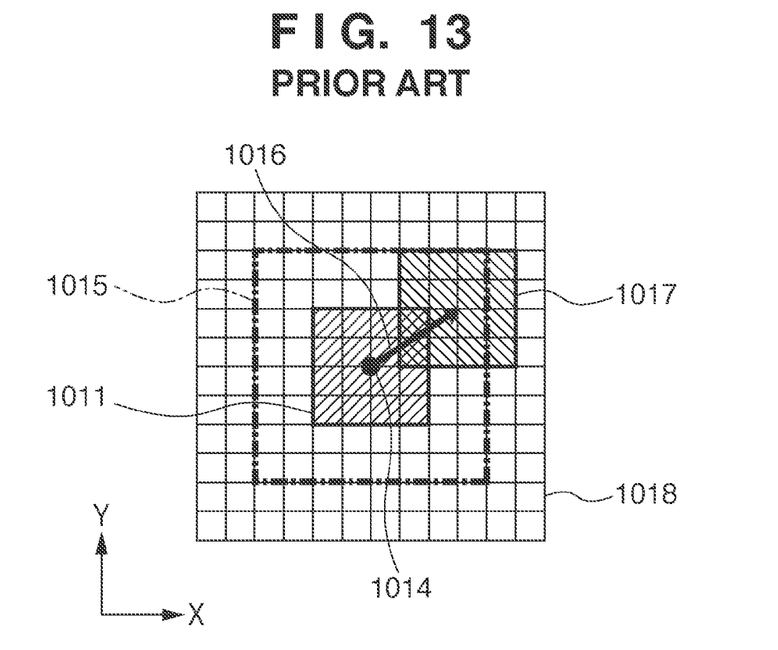
FIG. 13 is a fourth diagram for describing the block matching technique.

For example, if the reference block 1017 is located at a position that is offset from the position of the target block 1001 by one pixel in the X direction, the reference vector 1016 is a vector (1, 0). As shown in FIG. 13, if the reference block 1017 is located at a position that is offset from the position of the target block 1001 by three pixels in the X direction and two pixels in the Y direction, the reference vector 1016 is a vector (3, 2).

Thus, as shown in FIG. 13, the reference vector 1016 means a positional offset (a vector including the amount and direction of the positional offset) between the reference block 1017 and the target block 1001. Note that, in FIG. 13, the positions of the projected image block 1011 of the target block 1001 and the reference block 1017 are defined to be the center positions of the respective blocks.

The reference block 1017 is moved in a manner that allows the center position of the reference block 1017 to lie within the search range 1015. Because the reference block 1017 is made of a plurality of pixels in the horizontal and the vertical directions, the maximum range within which the reference block 1017 that is subjected to the block matching process with the target block 1001 is moved is a matching process range 1018 that is larger than the search range 1015 as shown in FIG. 13.

Thereafter, the position of the reference block 1017 that is determined to have a highest correlation with the image content of the target block 1001, is detected as the position (position after movement) in the reference frame 1010 of the target block 1001 of the target frame 1000. The reference block thus detected is defined as the aforementioned motion compensation block 1012. Thereafter, a positional offset amount between the position of the detected motion compensation block 1012 and the position of the target block 1001 is detected as the motion vector 1013 including the amount and direction of the positional offset as its components.

Here, a correlation value indicating the degree of correlation between the target block 1001 and the reference block 1017 moved within the search range 1015 is basically calculated using corresponding pixel values of the target block 1001 and the reference block 1017. This calculation is performed by a technique employing root-mean-square or other various techniques that have already been proposed.

Figure 14:
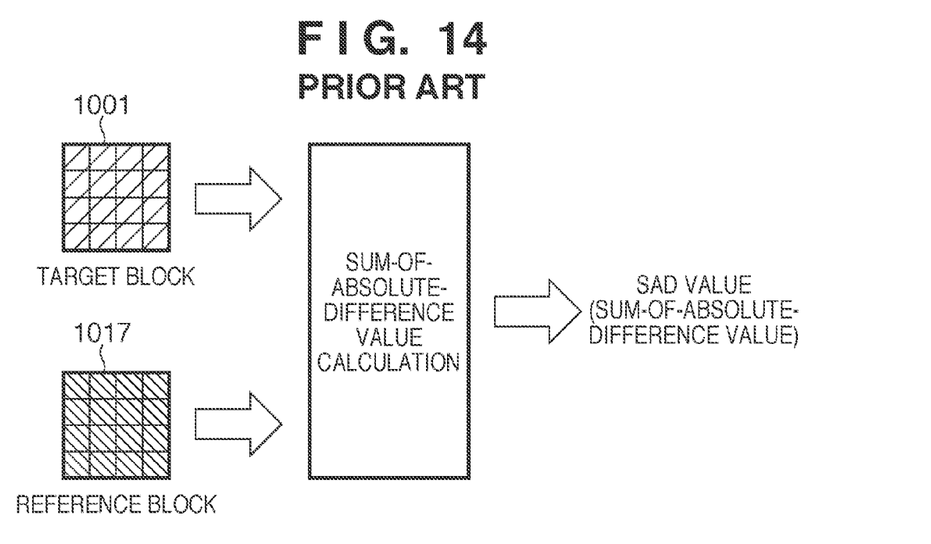
FIG. 14 is a fifth diagram for describing the block matching technique.

As a correlation value typically used to calculate a motion vector, the total sum of the absolute values of the differences between the luminance values of all the pixels of the target block 1001 and the luminance values of the respective corresponding pixels of the reference block 1017 is used, for example (see FIG. 14). The total sum of the absolute values of the differences is referred to as a sum-of-absolute-difference (SAD) value.

When the SAD value is used as the correlation value, a smaller SAD value indicates a higher correlation. Therefore, when the reference block 1017 is moved within the search range 1015, the reference block 1017 that is located at a position where the SAD value is smallest is a most correlated reference block having a highest correlation. The most correlated reference block is detected as the motion compensation block 1012, and a positional offset between the position of the detected motion compensation block 1012 and the position of the target block 1001 is detected as a motion vector.

As described above, in the block matching, the positional offset of each of a plurality of reference blocks 1017 set within the search range 1015 with respect to the position of the target block 1001 is represented by the reference vector 1016 including the amount and direction of the positional offset as its components. The reference vector 1016 of each reference block 1017 has values that vary depending on the position of the reference block 1017 in the reference frame 1010.

In the block matching, the SAD value between each of the reference blocks 1017 set within the search range 1015 and the target block 1001 (hereinafter referred to as the SAD value of each reference block 1017 for the sake of simplicity) is initially calculated.

Figure 15:
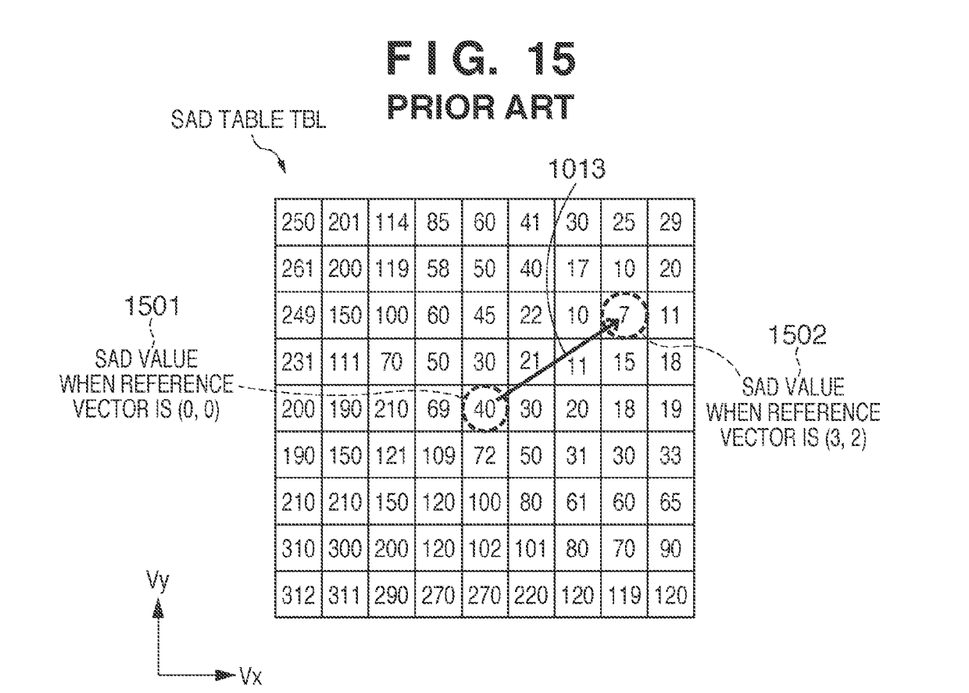
FIG. 15 is a sixth diagram for describing the block matching technique.

Next, as shown in FIG. 15, the SAD values thus calculated are stored into a memory in association with the reference vectors 1016 corresponding to the positions of the respective reference blocks 1017. Thereafter, a reference block having a smallest SAD value is detected from all the reference blocks stored in the memory, thereby detecting the motion vector 1013. Note that, for the sake of simplicity, the vector depending on the position of the reference block 1017 is hereinafter referred to as the reference vector 1016 of the reference block 1017.

A list of correlation values (in this example, SAD values) of the reference blocks 1017 set within the search range 1015 that are stored in association with the reference vectors 1016 corresponding to the positions of the reference blocks 1017, is referred to as a correlation value table. In this example, because the sum-of-absolute-difference (SAD) value is used as the correlation value, the correlation value table is referred to as a sum-of-absolute-difference table (hereinafter referred to as an SAD table).

An example SAD table TBL is shown in FIG. 15. In the SAD table TBL, a correlation value (in this example, an SAD value) of each reference block 1017 is referred to as a correlation value table element. In FIG. 15, an SAD value 1501 is one that is obtained when the reference vector is a vector (0, 0). The smallest SAD value is "7" (indicated by 1502 in FIG. 15) where the reference vector is a vector (3, 2). Therefore, the motion vector 1013 is obtained as the vector (3, 2).

Note that, in the above description, the positions of the target block 1001 and the reference block 1017 refer to any specific positions (e.g., center positions) of the respective blocks. The reference vector 1016 indicates an offset (including a amount and a direction) between the position of the projected image block 1011 of the target block 1001 in the reference frame 1010 and the position of the reference block 1017.

The reference vector 1016 corresponding to each reference block 1017 indicates a positional offset of the reference block 1017 from the position of the projected image block 1011 corresponding to the target block 1001, in the reference frame 1010. Therefore, if the position of the reference block 1017 is specified, the value of the reference vector corresponding to the position is specified. As a result, if the address of a correlation value table element corresponding to the reference block in the SAD table (memory) is specified, a corresponding reference vector is specified.

An affine coefficient calculator 203 uses the motion vectors for the regions in the target image that have been detected by the motion vector detector 202 to calculate affine coefficients that are coordinate transformation coefficients that are used to correct the regions. Specifically, the affine coefficient calculator 203 calculates affine coefficients for each of local regions that are defined as regions located at the four corners of the target image, using the motion vectors of 2×2 regions (hatched portions in FIG. 3) including the corresponding one of the four corner regions. For example, affine coefficients for a region 47 located at the lower right corner of the target image are calculated using the motion vectors of regions 38, 39, 46, and 47. The affine coefficient calculator 203 also calculates affine coefficients for regions that are not used in the calculation of the affine coefficients for the local regions, using the motion vectors of those regions. Specifically, in this embodiment, the affine coefficient calculator 203 calculates affine coefficients $A_{p1}$-$A_{p4}$ for the local regions located in the 1st to 4th quadrants, and affine coefficients $A_{p0}$ for regions that are not used in the calculation of the affine coefficients for the local regions. Note that the affine coefficients may be calculated using, for example, a technique (disclosed in Japanese Patent Laid-Open No. 2009-258868) described below.

An ideal motion vector for one target block (region) is obtained by affine transformation using the coordinates (x, y) of a center of the target block:

$$\begin{bmatrix} v \\ w \end{bmatrix} = \begin{bmatrix} a & b & c \\ d & e & f \end{bmatrix} \begin{bmatrix} x \\ y \\ 1 \end{bmatrix} = \begin{bmatrix} a \cdot x + b \cdot y + c \\ d \cdot x + e \cdot y + f \end{bmatrix} \quad (1)$$

where v and w are the horizontal and vertical components of the ideal motion vector, respectively, and a, b, c, d, e, and f are affine coefficients.

In other words, affine coefficients for a region including a plurality of blocks, such as the aforementioned local region, can be calculated by minimizing the total sum $\epsilon$ of errors between motion vectors obtained by the block matching technique and the ideal motion vectors, of all the blocks in the region.

According to Expression 1, the ideal motion vector $V_n$ of a block n in a region is obtained by:

$$V_n = \begin{bmatrix} a & b & c \\ d & e & f \end{bmatrix} \begin{bmatrix} x_n \\ y_n \\ 1 \end{bmatrix}$$

where the coordinates of the center of the block n in the region are $(X_n, Y_n)$.

In this case, the error $\epsilon_n$ of the block n is represented using the motion vector $(v_n, w_n)$ obtained for the block n:

$$\varepsilon_n^2 = \left| V_n - \begin{bmatrix} v_n \\ w_n \end{bmatrix} \right|^2$$

Therefore, the total sum $\epsilon$ of the errors is obtained by:

$$\varepsilon^2 = \sum \varepsilon_n^2$$
$$= \sum \{(a \cdot x_n + b \cdot y_n + c - v_n)^2 + (d \cdot x_n + e \cdot y_n + f - w_n)^2\}$$

Specifically, affine coefficients that minimize the total sum $\epsilon$ of the errors may be estimated by, for example, the least square method. Specifically, based on:

$$\frac{\partial \varepsilon^2}{\partial a} = 0, \quad \frac{\partial \varepsilon^2}{\partial b} = 0, \quad \frac{\partial \varepsilon^2}{\partial c} = 0$$

the following is obtained:

$a \cdot x_2 + b \cdot xy + c \cdot x = vx$ $a \cdot xy + b \cdot y_2 + c \cdot y = vy$ $a \cdot x + b \cdot y + c \cdot n = v$ (2)

where n is the total number of blocks, and:

$x_2 \equiv \Sigma x^2$ $xy \equiv \Sigma xy$ $y_2 \equiv \Sigma y^2$ $x \equiv \Sigma x$ $y \equiv \Sigma y$ $vx \equiv \Sigma vx$ $vy \equiv \Sigma vy$ $v \equiv \Sigma v$ According to Expression 2, the affine coefficients a, b, and c are obtained by:

$$a = \frac{(n \cdot y_2 - y^2)(n \cdot vx - v \cdot x) - (n \cdot xy - x \cdot y)(n \cdot vy - v \cdot y)}{(n \cdot x_2 - x^2)(n \cdot y_2 - y^2) - (n \cdot xy - x \cdot y)^2}$$

$$b = \frac{(n \cdot xy - x \cdot y)(n \cdot vx - v \cdot x) - (n \cdot x_2 - x^2)(n \cdot vy - v \cdot y)}{(n \cdot xy - x \cdot y)^2 - (n \cdot x_2 - x^2)(n \cdot y_2 - y^2)}$$

$$c = \frac{(x \cdot y_2 - xy \cdot y)(n \cdot vx - v \cdot x_2) - (xy \cdot x - x_2 \cdot y)(vy \cdot x - v \cdot xy)}{(n \cdot y_2 - xy \cdot y)(x^2 - n \cdot x_2) - (xy \cdot x - x_2 \cdot y)(x \cdot y - n \cdot xy)}$$

Similarly, the affine coefficients d, e, and f are obtained by:

$$d = \frac{(n \cdot y_2 - y^2)(n \cdot wx - w \cdot x) - (n \cdot xy - x \cdot y)(n \cdot wy - w \cdot y)}{(n \cdot x_2 - x^2)(n \cdot y_2 - y^2) - (n \cdot xy - x \cdot y)^2}$$

$$e = \frac{(n \cdot xy - x \cdot y)(n \cdot wx - w \cdot x) - (n \cdot x_2 - x^2)(n \cdot wy - w \cdot y)}{(n \cdot xy - x \cdot y)^2 - (n \cdot x_2 - x^2)(n \cdot y_2 - y^2)}$$

$$f = \frac{(x \cdot y_2 - xy \cdot y)(n \cdot wx - w \cdot x_2) - (xy \cdot x - x_2 \cdot y)(wy \cdot x - w \cdot xy)}{(n \cdot y_2 - xy \cdot y)(x^2 - n \cdot x_2) - (xy \cdot x - x_2 \cdot y)(x \cdot y - n \cdot xy)}$$

where $wx \equiv \Sigma wx$ $wy \equiv \Sigma wy$ $w \equiv \Sigma w$

An affine coefficient interpolator 204 calculates affine coefficients for regions for which the affine coefficient calculator 203 has not calculated affine coefficients, by performing a weighted calculation using the affine coefficients calculated by the affine coefficient calculator 203. Specifically, in the first quadrant, affine coefficients have not been calculated for the regions 38, 39, and 46. For example, affine coefficients for these regions are calculated using the following expression with a weighting coefficient $\alpha_n$ set for each of the regions:

$A_n = \alpha_n \times A_{p0} + (1 - \alpha_n) \times A_{p1}$

Figure 4:
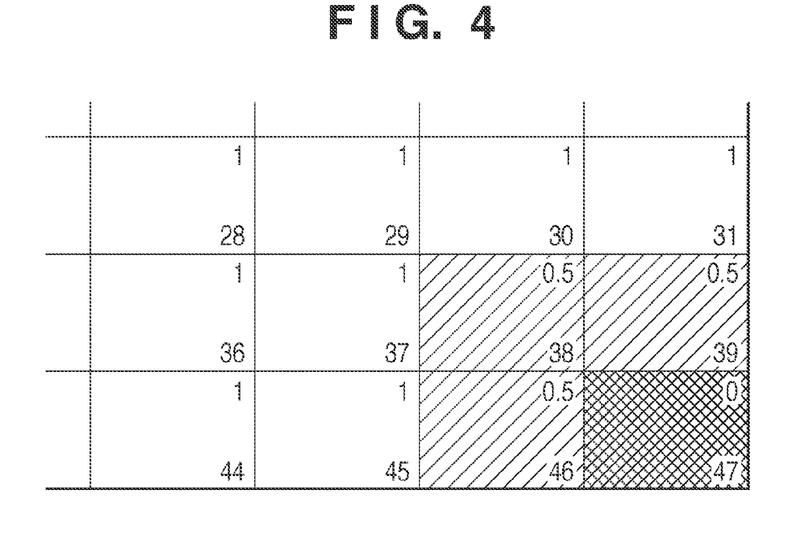
FIG. 4 is a diagram showing a weighting coefficient for each region in calculation of affine coefficients in the embodiment of the present invention.

The weighting coefficient $\alpha_n$ for each region for which affine coefficients have not been calculated is a numerical value that is shown at an upper right portion of the region in FIG. 4, for example. In the example of FIG. 4, the weighting coefficient is set so that a weight for $A_{p0}$ is 0 in the local region, that is, the weighting coefficient for each region for which affine coefficients have not been calculated is 0.5. In this case, affine coefficients can be calculated for all regions in the target image. Although, in this embodiment, affine coefficients are calculated for each region by the aforementioned technique, the present invention is not limited to this.

A correction amount difference calculator 205 calculates, for a point of interest in the local region, a difference between a correction amount that is calculated using affine coefficients for the local region and a correction amount that is calculated using affine coefficients for a region neighboring the local region. Specifically, the amount (scalar value) of the difference between a movement vector (local vector) that is obtained by performing affine transformation on a vector to the point of interest in the target image using affine coefficients for the local region and a movement vector (neighboring vector) that is obtained by performing affine transformation on the vector to the point of interest in the target image using affine coefficients for a neighboring region, is calculated. By using Expression 1 described above, an affine transformation formula from a point U to a point V can be defined by:

$$V = A * U$$

$$\begin{bmatrix} v_x \\ v_y \end{bmatrix} = \begin{bmatrix} a & b & c \\ d & e & f \end{bmatrix} \begin{bmatrix} u_x \\ u_y \\ 1 \end{bmatrix}$$

Figure 5:
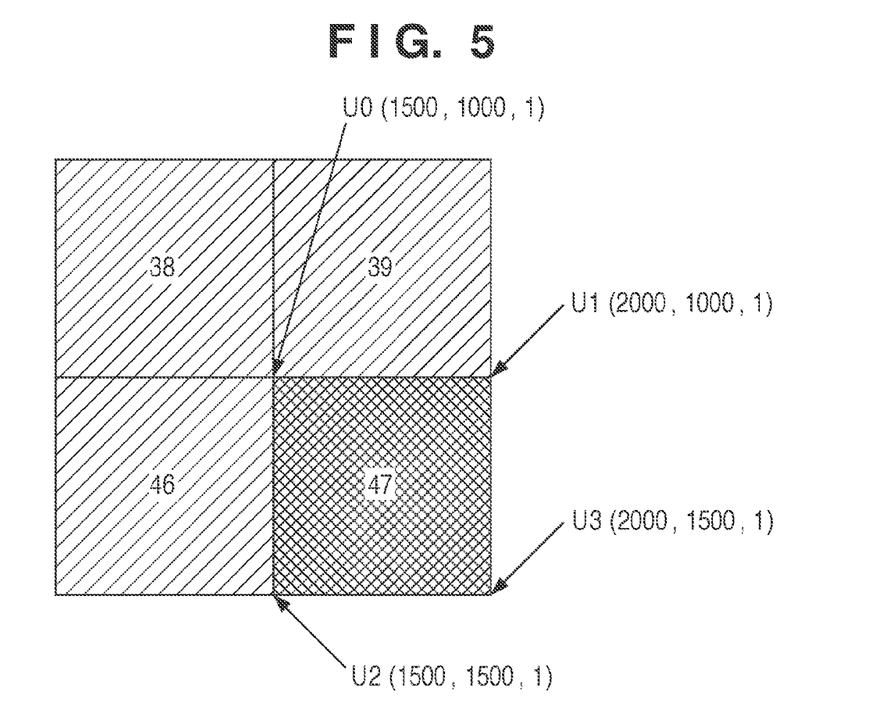
FIG. 5 is a diagram showing point of interests in a local region in the embodiment of the present invention.

For example, a case where a point U3 in the local region shown in FIG. 5 is selected as a point of interest for the local region will be described hereinafter. Although affine coefficients for neighboring regions are assumed to be $A_{p0}$ in this embodiment, the present invention is not limited to this. For example, the affine coefficients for the neighboring regions may be those for regions adjacent to the local region.

For example, when $A_{p0}$ and $A_{p1}$ are represented by the following matrices:

$$A_{p0} = \begin{bmatrix} 1 & 0 & 100 \\ 0 & 1 & 0 \end{bmatrix}, \quad A_{p1} = \begin{bmatrix} 1 & 0 & 0 \\ 0 & 1 & 100 \end{bmatrix}$$

a local vector $V_{31}$ and a neighboring vector $V_{30}$ that are obtained by performing affine transformation on U3 using the affine coefficients for the local region and the neighboring region are:

$$V_{31} = \begin{bmatrix} 2000 \\ 1600 \end{bmatrix}, \quad V_{30} = \begin{bmatrix} 2100 \\ 1500 \end{bmatrix}$$

In this case, a difference vector $\Delta V_{3err}$ indicating the difference is:

$$\Delta V_{3err} = \begin{bmatrix} -100 \\ 100 \end{bmatrix}$$

The amount $|\Delta V_{3err}|$ is:

$$|\Delta V_{3err}| = \left| \begin{bmatrix} -100 \\ 100 \end{bmatrix} \right| = 141$$

An affine coefficient modifier 206, when blur in the object image has been corrected for each region in the target image, determines whether or not the difference in correction amount calculated by the correction amount difference calculator 205 falls within a limit value that is previously determined to be a value that causes the positional offset of the object image not to be noticeable between the corrected regions. Specifically, the affine coefficient modifier 206 determines whether or not the difference between a correction amount used in correction performed for the neighboring region and a correction amount used in correction performed for the local region falls within a range in which the positional offset of the object image between regions is acceptable. In this case, when the correction amount difference falls within the predetermined limit value range, then even if affine transformation is performed on the local region using affine coefficients for the local region to correct the target image, the positional offset of the object image is substantially not noticeable between regions in the corrected target image. In other words, even in the local region for which a large correction amount is expected as in this embodiment, blur in the object image can be accurately corrected.

Figure 6:
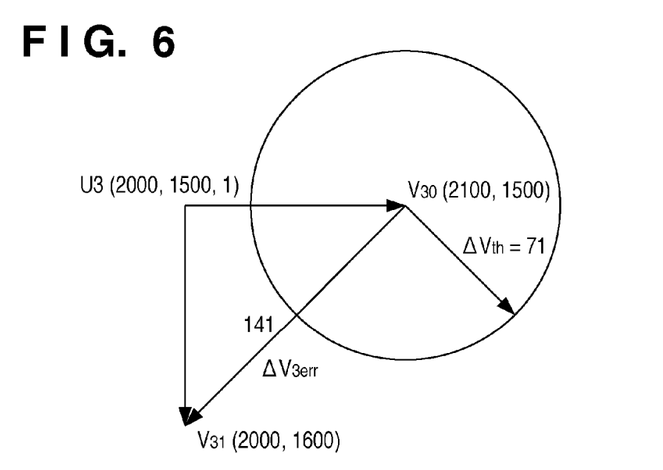
FIG. 6 is a diagram for describing a correction amount difference in a first embodiment of the present invention.

On the other hand, when the correction amount difference exceeds a predetermined limit value $\Delta V_{th}$ as shown in FIG. 6, then if the local region is corrected by affine transformation using affine coefficients for the local region, a significant positional offset occurs in the object image between regions in the corrected target image. Therefore, the affine coefficient modifier 206 modifies affine coefficients for the local region so that the correction amount difference falls within the predetermined limit value. In this embodiment, the affine coefficient modifier 206, when the correction amount difference exceeds the predetermined limit value, changes affine coefficients for the local region to affine coefficients for the neighboring region. In this case, although the accuracy of correction of blur in the object image in the corrected target image is reduced, a corrected image in which the positional offset of the object image does not exist at least between regions can be obtained. Note that the affine coefficient modifier 206 performs a weighting calculation as with the affine coefficient interpolator 204 after modifying the affine coefficients for the local region, to set new affine coefficients for all regions in the target image.

An affine transformer 207 calculates correction amounts for all the regions using affine coefficients for all the regions calculated by the affine coefficient interpolator 204 or affine coefficients for all the regions newly calculated by the affine coefficient modifier 206, and outputs a corrected target image. Specifically, the affine transformer 207 performs affine transformation for each of the regions in the target image using affine coefficients for the region to calculate positions where the target image is to be corrected, and corrects blur in the object image for each region.

Figure 7:
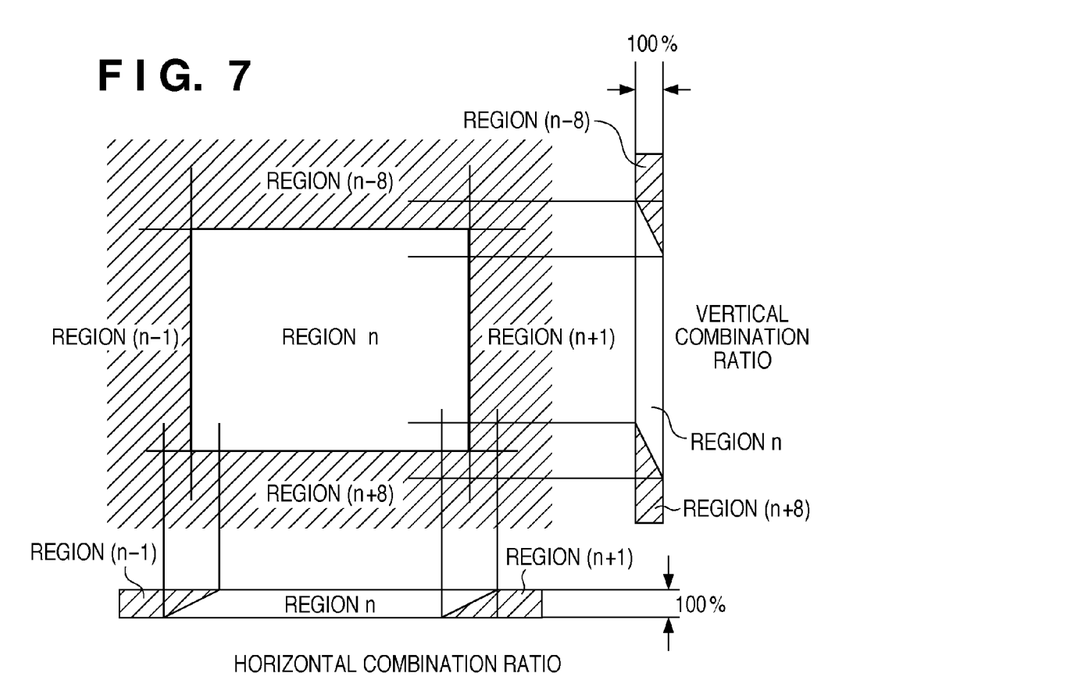
FIG. 7 is a diagram for describing a combination process in an affine transformer.

Note that, as shown in FIG. 7, the affine transformer 207 combines adjacent regions at a boundary therebetween in the target image in order to prevent a missing pixel from occurring due to a positional offset of the object image between regions or a translational movement between regions. To do this, the affine transformer 207 receives, for each region, an image having pixels the number of which is greater than the number of pixels in each region into which the target image is divided (FIG. 3), and moves the region by a correction amount that has been calculated using affine coefficients for the region. Thereafter, the affine transformer 207 combines images of regions where adjacent regions overlap each other, by linearly changing the combination ratio, thereby causing the positional offset of the object image between regions to be less noticeable.

The target image thus corrected is output from the image processor 107 and is recorded into a recording medium 108. Examples of the recording medium 108 include an internal memory provided in the digital camera 100 and a recording device (e.g., a memory card, an HDD, etc.) detachably mounted to the digital camera 100. Note that when blur in an object image in a captured image is not corrected, a predetermined transformation process or encoding process may be performed on image data output from the A/D converter 106 before being recorded into the recording medium 108.

As described above, the image processing device of this embodiment can correct an offset of an input target image from an input reference image that is caused by the motion of an imaging device that captures the target image. Specifically, the image processing device divides the target image into a plurality of regions, and sets at least one of the plurality of regions as a local region. The image processing device also calculates coordinate transformation coefficients for each of the plurality of regions, and calculates correction amounts that are used to correct the offset of the target image, using coordinate transformation coefficients for the local region and a region neighboring the local region, respectively, for at least one point of interest in the local region. Thereafter, the image processing device determines whether or not the difference between the correction amount obtained using the coordinate transformation coefficients for the local region and the correction amount obtained using the coordinate transformation coefficient for the neighboring region falls within a predetermined limit value. In this case, if the correction amount difference does not fall within the predetermined limit value, coordinate transformation coefficients are newly calculated for each of the plurality of regions (including the local region) so that the correction amount difference falls within the predetermined limit value, and the target image is corrected for each of the plurality of regions using the newly obtained coordinate transformation coefficients.

As a result, blur in the object image can be corrected without an increase in the amount of computation or an image degradation (e.g., a discontinuation in the object image in the captured image).

(Variation)

In the first embodiment described above, a technique of determining whether to modify affine coefficients for each region based on the difference between a correction amount calculated using affine coefficients for a local region and a correction amount calculated using affine coefficients for a neighboring region, for at least one point of interest in the local region, has been described. In this variation, a technique of determining whether to modify affine coefficients for each region based on the difference between correction amounts calculated for a plurality of points of interest in a local region, will be described.

In this variation, the correction amount difference calculator 205 calculates the difference between a correction amount calculated using affine coefficients for a local region and a correction amount calculated using affine coefficients for neighboring regions, for four points of interest U0, U1, U2, and U3 of FIG. 5. Note that, also in this variation, $A_{p0}$ is used as one region neighboring the local region.

In this case, if the correction amount difference for at least one of the four points of interest calculated by the correction amount difference calculator 205 does not fall within the predetermined limit value, the affine coefficient modifier 206 newly calculates affine coefficients. Specifically, if the correction amount difference for at least one point of interest exceeds the predetermined limit value, the affine coefficient modifier 206 modifies affine coefficients for the local region so that the correction amount difference falls within the predetermined limit value in the following manner. For the point of interest whose correction amount difference exceeds the predetermined limit value, the affine coefficient modifier 206 modifies the affine coefficients for the local region so that the correction amount difference calculated using the affine coefficients for the local region and the neighboring regions falls within the predetermined limit value.

Figure 8:
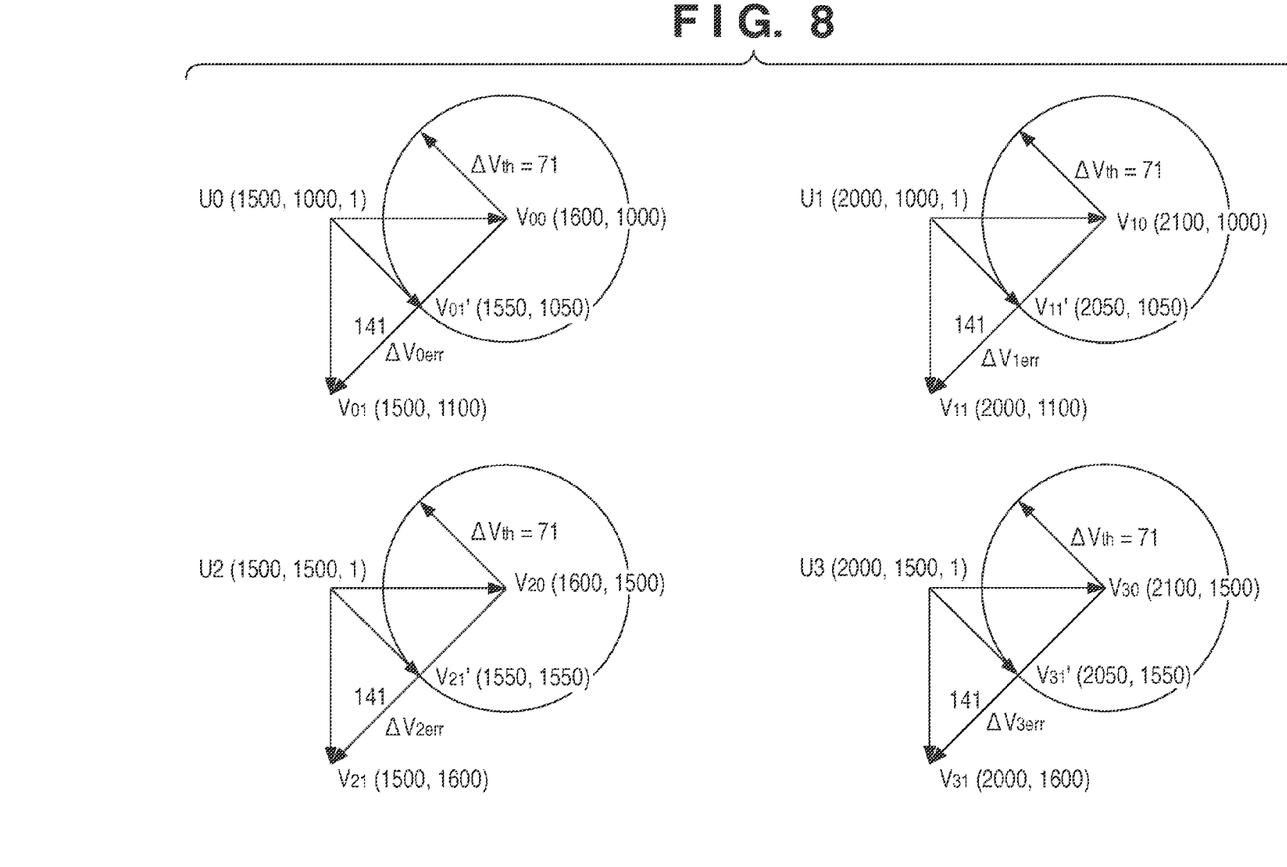
FIG. 8 is a diagram for describing a correction amount difference in a variation of the first embodiment of the present invention.

For example, as shown in FIG. 8, it is assumed that, for all four points of interest, a correction amount difference $\Delta V_{nerr}$ exceeds a predetermined limit value $\Delta V_{th}$. Note that correction amount differences calculated for all the four points of interest are the same in the example of FIG. 8, the affine coefficients for the local region may be modified so that the correction amount differences for all the points of interest are equal to $\Delta V_{th}$.

Specifically, in the example of FIG. 8, for each of the four points of interest U0, U1, U2, and U3, a local vector obtained by affine transformation using the affine coefficient for the local region, and neighboring vectors obtained by affine transformation using the affine coefficients for the neighboring regions, are shown. For example, for U0, a local vector $V_{01}$ and a neighboring vector $V_{00}$ are:

$$V_{01} = \begin{bmatrix} 1500 \\ 1100 \end{bmatrix}, \quad V_{00} = \begin{bmatrix} 1600 \\ 1000 \end{bmatrix}$$

In this case, the amount $|\Delta V_{0err}|$ of a difference vector indicating the difference is:

$$|\Delta V_{0err}| = \left\| \begin{bmatrix} -100 \\ 100 \end{bmatrix} \right\| = 141$$

For example, when $\Delta V_{th}$ is 71, which is half the $|\Delta V_{0err}|$, the affine coefficient modifier 206 calculates affine coefficients for the local region that provide a local vector $V'_{01}$ so that the correction amount difference is $\Delta V_{th}$. Similarly, affine coefficients for the local region are calculated so that a local vector $V'_{11}$ is obtained for U1, and $V'_{21}$ for U2 and $V'_{31}$ for U3. Specifically, by using the aforementioned affine coefficient calculation technique, affine coefficients for the local region are calculated from four sets of coordinates of U0 and $V'_{01}$, U1 and $V'_{11}$, U2 and $V'_{21}$, and U3 and $V'_{31}$. For example, in this case, the calculated affine coefficients for the local region are:

$$A'_{p1} = \begin{bmatrix} 1 & 0 & 50 \\ 0 & 1 & 50 \end{bmatrix}$$

Note that the affine coefficient modifier 206 newly calculates affine coefficients for all regions in the target image because of the modification of the affine coefficients for the local region.

As a result, in this variation, the target image can be corrected so that the positional offset of the object image is not noticeable between corrected regions (the positional offset falls within the predetermined limit value range). Therefore, the positional offset of the object image can be caused to be less noticeable between regions, and the correction can be performed with a reduced amount of computation.

(Second Embodiment)

In the first embodiment and variation described above, a technique of adjusting affine coefficients for each region in a target image by calculating a correction amount difference for only a local region or regions has been described. In this embodiment, a technique of correcting blur in an object image in a local region and regions neighboring the local region by calculating a correction amount difference of each of regions used for calculation of affine coefficients for the local region, using affine coefficients for the region and regions adjacent thereto.

As shown in FIG. 5, in this embodiment, the correction amount difference calculator 205 calculates correction amount differences of the points of interest U0, U1, U2, and U3 for the regions 38, 39, 46, and 47 used for calculation of affine coefficients for the local region 47 (i.e., one point of interest for each region). Specifically, for each point of interest, there is the following correspondence between affine coefficients used for calculation of a correction amount difference:

| Point of interest | Region of affine coefficients for calculation of local vector | Region of affine coefficients for calculation of neighboring vector |
|---|---|---|
| U0 | 38 | 37 |
| U1 | 39 | 31 |
| U2 | 46 | 45 |
| U3 | 47 | 46 |

Note that the points of interest are not limited to the above four points. Any points included in regions used for calculation of affine coefficients for the local region may be used.

The affine coefficient modifier 206 determines whether or not the correction amount difference calculated by the correction amount difference calculator 205 for each of the four points of interest falls within the predetermined limit value. Specifically, for 2×2 regions located at each of the four corners of the target image used for calculation of affine coefficients for the local region, the affine coefficient modifier 206 determines whether or not the positional offset of the object image between adjacent regions caused by the correction amount difference between the regions falls within an acceptable range.

Figure 9:
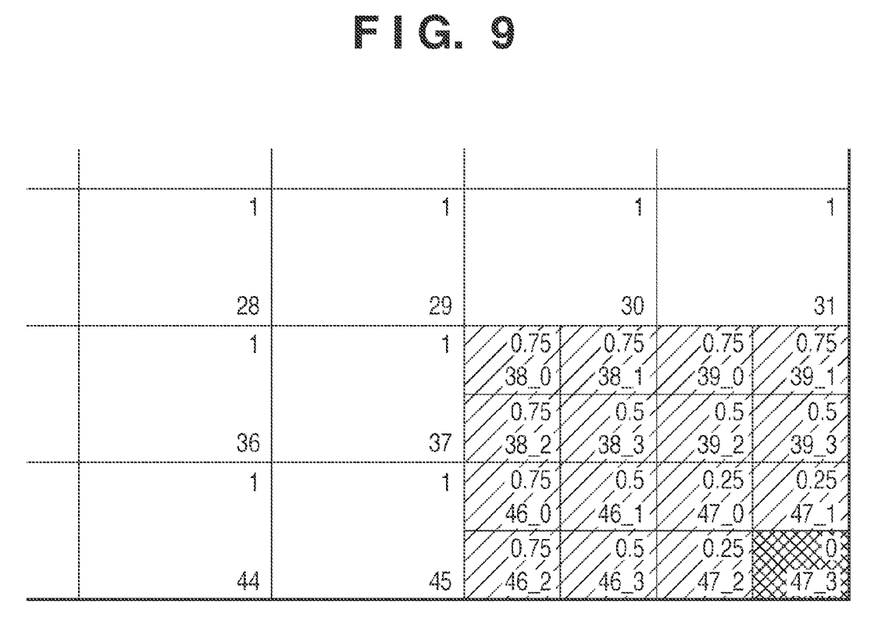
FIG. 9 is a diagram for describing division of a region into subregions in a second embodiment of the present invention.

In this case, when the correction amount difference exceeds the predetermined limit value for at least one region, the image divider 201 divides only a region or regions used for calculation of affine coefficients for the local region into subregions having a smaller number of pixels as shown in FIG. 9, for example. Thereafter, the affine coefficient modifier 206 calculates affine coefficients for each of the subregions. Thus, when it is determined that the correction amount difference does not fall within the predetermined limit value, the local region and the neighboring regions are divided into smaller subregions, and affine coefficients are calculated for the subregions, whereby the correction amount difference between each subregion can be reduced. In other words, because the correction amount difference between adjacent subregions has a smaller value, the positional offset of the object image between subregions can be less noticeable.

As a result, blur in the object image can be accurately corrected with a minimum increase in the amount of computation and without an image degradation, such as a discontinuation in the object image in the captured image.

Although, in the aforementioned first and second embodiments and variation, a technique of correcting blur in an object image between a reference image and a target image by detecting a motion vector of the object image between the two images has been described, the present invention is not limited to this. Alternatively, the present invention may be applied to the so-called electronic image stabilization. Specifically, motion vectors of a plurality of target images with respect to one reference image may be detected, corrected images obtained from the target images and the reference image may be subjected to gain adjustment using the reciprocal of the number of the images before all the images are combined.

As described above, features of the present invention described in the first and second embodiments and variation described above are as follows.

For at least one point of interest of a local region (1-1), or at least one point of interest in each of the local region and a region neighboring the local region (1-2), it is determined whether or not a correction amount difference obtained when affine transformation is performed using:

affine coefficients for the local region and the neighboring region (2-1), or affine coefficients for a region in which the point of interest exists and a region adjacent thereto (2-2), falls within a predetermined limit value that is previously defined as a region within which, when blur in an object image in a target image is corrected for each region, the positional offset of the object image is not noticeable between the corrected regions.

In this case, when the correction amount difference exceeds the predetermined limit value, in order to cause the correction amount difference to fall within the predetermined limit value, the affine coefficients for the local region are changed to affine coefficients for the neighboring region (3-1), the affine coefficients for the local region are modified to cause the correction amount difference to fall within the predetermined limit value (3-2), or the local region and the neighboring region are divided into subregions to interpolate the affine coefficients (3-3).

As a result, blur in the object image can be corrected without an image degradation, such as a discontinuation in the object image in the captured image.

Although specific combinations of the above features have been described in the first and second embodiment and the variation for ease of description and understanding, it will be readily understood that the features (1)-(3) can be combined in any suitable manner.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2010-160097, filed Jul. 14, 2010 and 2011-127658, filed Jun. 7, 2011, which are hereby incorporated by reference herein in their entirety

What is claimed is:

1. An image processing device including a correction unit configured to compare a reference image with a target image, and correct an offset of the target image from the reference image that is caused by motion of an imaging device capturing the target image, for each region of the target image, the device comprising:

a division unit configured to divide the target image into a plurality of the regions;

a setting unit configured to set at least one of the plurality of regions as a local region;

a coordinate transformation coefficient calculation unit configured to calculate a coordinate transformation coefficient for each of the plurality of regions;

a correction amount calculation unit configured to, for at least one point of interest in the local region set by the setting unit, calculate a correction amount that is used when the offset of the target image is corrected using the coordinate transformation coefficient for the local region calculated by the coordinate transformation coefficient calculation unit, and a correction amount that is used when the offset of the target image is corrected using the coordinate transformation coefficient for one of the plurality of regions neighboring the local region; and a determination unit configured to determine whether or not a difference between the correction amount obtained from the coordinate transformation coefficient for the local region calculated by the correction amount calculation unit, and the correction amount obtained from the coordinate transformation coefficient for the neighboring region calculated by the correction amount calculation unit, falls within a predetermined limit value, wherein the coordinate transformation coefficient calculation unit, when the determination unit determines that the correction amount difference does not fall within the predetermined limit value, newly calculates a coordinate transformation coefficient for each of the plurality of regions so that the correction amount difference falls within the predetermined limit value, and the correction unit corrects the offset of the target image for each of the plurality of regions using the correction amount obtained for the each of the plurality of regions using the newly calculated coordinate transformation coefficient.

2. The image processing device of claim 1, wherein the correction amount calculation unit is configured to, for a plurality of points of interest in the local region, calculate a correction amount that is used when the offset of the target image is corrected using the coordinate transformation coefficient for the local region, and a correction amount that is used when the offset of the target image is corrected using the coordinate transformation coefficient for the neighboring region, and the coordinate transformation coefficient calculation unit, when the determination unit determines that the correction amount difference does not fall within the predetermined limit value for at least one of the plurality of points of interest, newly calculates a coordinate transformation coefficient for each of the plurality of regions so that the correction amount differences for all of the plurality of points of interest fall within the predetermined limit value.

3. The image processing device of claim 1, wherein the coordinate transformation coefficient calculation unit, when the determination unit determines that the correction amount difference does not fall within the predetermined limit value, newly calculates a coordinate transformation coefficient so that the correction amount difference falls within the predetermined limit value.

4. The image processing device of claim 1, wherein the coordinate transformation coefficient calculation unit, when the determination unit determines that the correction amount difference does not fall within the predetermined limit value, changes the coordinate transformation coefficient for the local region to the coordinate transformation coefficient for the neighboring region.

5. The image processing device of claim 1, wherein the coordinate transformation coefficient calculation unit includes a detection unit configured to detect a motion vector for each of the plurality of regions, and calculates a coordinate transformation coefficient for each of the plurality of regions using the motion vector for the each of the plurality of regions detected by the detection unit.

6. The image processing device of claim 1, wherein the predetermined limit value is defined so that when the offset of the target image is corrected for each of the plurality of regions using the coordinate transformation coefficient for the each of the plurality of regions, a positional offset of the object image is not noticeable between the corrected regions.

7. The image processing device of claim 1, wherein the neighboring region is adjacent to the local region.

8. A method for controlling an image processing device including a correction unit configured to compare a reference image with a target image, and correct an offset of the target image from the reference image that is caused by motion of an imaging device capturing the target image, for each region of the target image, the method comprising the steps of:

dividing the target image into a plurality of the regions;

setting at least one of the plurality of regions as a local region;

calculating a coordinate transformation coefficient for each of the plurality of regions;

calculating, for at least one point of interest in the local region set in the setting step, a correction amount that is used when the offset of the target image is corrected using the coordinate transformation coefficient for the local region calculated in the coordinate transformation coefficient calculating step, and a correction amount that is used when the offset of the target image is corrected using the coordinate transformation coefficient for one of the plurality of regions neighboring the local region; and determining whether or not a difference between the correction amount obtained from the coordinate transformation coefficient for the local region calculated in the correction amount calculating step, and the correction amount obtained from the coordinate transformation coefficient for the neighboring region calculated in the correction amount calculating step, falls within a predetermined limit value, wherein, in the coordinate transformation coefficient calculating step, when it is determined in the determining step that the correction amount difference does not fall within the predetermined limit value, a coordinate transformation coefficient for each of the plurality of regions is newly calculated so that the correction amount difference falls within the predetermined limit value, and in the correcting step, the offset of the target image is corrected for each of the plurality of regions using the correction amount obtained for the each of the plurality of regions using the newly calculated coordinate transformation coefficient.

* * * * *